US006177914B1

(12) United States Patent
Iwama et al.

(10) Patent No.: US 6,177,914 B1
(45) Date of Patent: Jan. 23, 2001

(54) PLASMA ADDRESSED ELECTRO-OPTICAL DISPLAY

(75) Inventors: Jun Iwama; Hironobu Abe, both of Kanagawa (JP)

(73) Assignee: Sony Corporation, Tokyo (JP)

( * ) Notice: Under 35 U.S.C. 154(b), the term of this patent shall be extended for 0 days.

(21) Appl. No.: 09/005,018

(22) Filed: Jan. 9, 1998

(30) Foreign Application Priority Data

Jan. 10, 1997 (JP) .................................................. 9-014691

(51) Int. Cl.[7] .............................. G09G 3/28; G09G 3/36; G02F 1/133

(52) U.S. Cl. ................................ 345/60; 345/87; 345/94; 349/36

(58) Field of Search ................................. 345/60, 87, 94; 349/36, 37

(56) References Cited

U.S. PATENT DOCUMENTS 5,757,342 * 5/1998 Hayashi ................................ 345/60
5,940,064 * 8/1999 Kai et al. ............................ 345/173

FOREIGN PATENT DOCUMENTS 0 651 368 A1 5/1995 (EP) .
0 700 028 3/1996 (EP) .
WO 97/44774 11/1997 (WO) .

* cited by examiner

*Primary Examiner*—Richard A. Hjerpe
*Assistant Examiner*—Duc Dinh
(74) *Attorney, Agent, or Firm*—Hill & Simpson

(57) ABSTRACT

The plasma addressed electro-optical display includes a panel having a plasma cell and a liquid crystal cell joined to each other with a dielectric sheet interposed in between. While the plasma cell has display channels arranged thereon in rows, the liquid crystal panel has signal electrodes arranged thereon in columns, which define pixels at the intersections with the display channels to thereby form an image. A scanning circuit is connected to the display channels and sequentially drives the display channels to discharge over the image and select pixels in each row through the dielectric sheet. A signal circuit is connected to the signal electrodes and drives the signal electrodes in synchronism with the driving for discharge and in accordance with one image of picture data, and, thereby, it writes signal voltages into the selected pixels. A calculating circuit, in accordance with externally input picture data, calculates effective potential differences occurring between adjoining signal electrodes in each row and accumulates the results over the image. A compensating circuit, in accordance with the results of accumulation, compensates for the signal voltages to be applied to the respective signal electrodes to thereby reduce the crosstalk caused by potential differences between adjoining signal electrodes.

16 Claims, 9 Drawing Sheets

PLASMA ADDRESSED ELECTRO-OPTICAL DISPLAY

BACKGROUND OF THE INVENTION

1. Field of the Invention

The present invention relates to a plasma addressed electro-optical display having a flat panel structure formed of a liquid crystal cell and a plasma cell affixed together with a dielectric sheet interposed in between. More particularly, it relates to a technology to prevent crosstalk from occurring in a plasma addressed electro-optical display.

2. Description of the Related Art

A plasma addressed electro-optical display panel is disclosed for example in Japanese Patent Laid-open No. Hei 1-217396 and FIG. 8 shows its structure. The plasma addressed electro-optical display panel has a flat structure formed of a liquid crystal cell 101 and a plasma cell 102 affixed together with a dielectric sheet 107 made of a thin glass plate or the like interposed in between. The plasma cell 102 is formed with a glass substrate 104 on the lower side and hermetically joined to the dielectric sheet 107 with a predetermined space in between. An ionized gas is contained in the hermetically sealed space. The glass plate 104 is provided on the lower side on the inner surface thereof, with a plurality of pairs of discharge electrodes 108 and 109 disposed parallel to each other. Each pair of the discharge electrodes 108 and 109 function as the anode and the cathode for ionizing the hermetically sealed-in gas to generate plasma discharge and, thus, they form a discharge channel. On the other hand, the liquid crystal cell 101 is provided with a liquid crystal layer 106 sandwiched between the dielectric sheet 107 and a glass substrate 103 on the upper side. The upper substrate 103 is provided, on the inner surface thereof, with signal electrodes 105 in a striped array. The signal electrodes 105 cross the above described discharge channels at right angles. The signal electrodes 105 function as column driving units and the discharge channels function as row scanning units and, at the intersections of them, there are defined pixels in a matrix array and an image is formed by the pixels in the matrix array.

The operating principle of the plasma addressed electro-optical display panel shown in FIG. 8 will be briefly described with reference to FIG. 9. In this panel, while the discharge channels in which plasma discharge takes place are selectively scanned in a line sequential manner over the screen, signal voltages are applied to the signal electrodes 105 on the liquid crystal cell side in synchronism with the selective scanning, and, thereby, a desired picture is displayed. To achieve this, a scanning circuit 201 is connected to the plasma cell side and a signal circuit 202 is connected to the liquid crystal cell side. When plasma discharge occurs in the discharge channel formed of an anode A and a cathode K, the potential therein is maintained virtually at the anode potential. When, in this state, a signal voltage is applied to the signal electrode 105, a signal voltage is written into the liquid crystal layer 106 of each pixel through the dielectric sheet 107. When the plasma discharge is ended, the discharge channel is left at a floating potential and the signal voltage written therein is held by each pixel. A so-called sampling is thus performed and, while the discharge channel functions as a sampling switch, the liquid crystal layer 106 functions as a sampling capacitor. The transmittance factor of the liquid crystal varies with the signal voltage used for the sampling and, thus, activating and extinguishing the plasma addressed electro-optical display panel is carried out by pixels as the units.

FIG. 10 is a drawing schematically showing only a portion of the signal electrodes 105 formed on the inner surface of the substrate 103 on the side of the liquid crystal cell 101. Although a color filter is placed over or under the signal electrodes 105 in constructing a color plasma addressed electro-optical display panel, it is not shown in the drawing. However, for the sake of explanation, colors assigned to the signal electrodes 105 are denoted by "Red", "Green", and "Blue". Now, if a cyan color is to be displayed in a normally white mode, the display of the color cyan can be achieved by applying a signal voltage, for example, of +70V to the signal electrode which is identified as Red, as shown in FIG. 10, and a signal for displaying the black image is applied to the Blue and Green electrodes. At this time, the adjoining Blue and Green signal electrodes receive horizontal electric fields as indicated by the arrows in the drawing. The liquid crystal existing between the signal electrode Red and the signal electrode Blue and between the signal electrode Red and the signal electrode Green receives the electric fields virtually in the horizontal direction and changes its molecular alignment. This phenomenon is called crosstalk. Since the liquid crystal at these portions is not necessary for the originally intended display of the color cyan, it is normally shut out from the visual field by placing black masks at the corresponding portions of the color filter. However, since, in the case of the plasma addressed electro-optical display panel, the electric field is applied to the liquid crystal through the dielectric sheet 107 (refer to FIG. 8 and FIG. 9), the signal voltage applied to each signal electrode 105 is set high. Therefore, the amount of crosstalk becomes much greater than in a normal active matrix type liquid crystal display panel or the like. Accordingly, the horizontal electric fields not only affect the gap portions between the adjoining signal electrodes but also affect the effective edge portions of the signal electrodes beyond the gap portions. If it is attempted to cover such effects with black masks, a considerable quantity of light is shielded thereby and it becomes impossible to provide a sufficient quantity of light for the display. Since such crosstalk is caused by leakage of the signal voltage, crosstalk appears most conspicuously at the time of displaying of the gray image which is performed by driving the liquid crystal at the portion of the applied voltage/transmittance characteristic where the slope is steep, i.e., in the range where the liquid crystal is more sensitive to the applied voltage (the voltage at this time is called a half-tone voltage).

When a horizontal band in a gray color is to be displayed on a screen with a background of a cyan color as shown in FIG. 11, the scanning is started in turn from the top of the screen and the color cyan is written in first. At this time, the liquid crystal existing between the signal electrodes receives the horizontal electric field at a considerably high level. Then, in the period when the gray band is written, half tone voltages at equal levels are applied to the electrodes of all the three colors of Blue, Red, and Green, and therefore the electric field is not applied in the horizontal direction. Then, with the progression of the scanning, the color cyan is written in as the remaining portion of the background and, thus, one frame is projected. Since the liquid crystal is actuated by the effective value of the applied voltage, when such an image is displayed, the liquid crystal existing between the adjoining signal electrodes at the edge portions of the differently colored regions suffers changes in the molecular alignment because most portions of it have been driven by the color cyan. Consequently, in the edge portion of the gray band, there is made a display in a color different from that (gray) originally intended. In the ordinary plasma addressed electro-optical display panel, there are arranged a great number of signal electrodes at narrow intervals. In order to improve the transmittance of the incident light, it is preferred that the gap between the signal electrodes be as narrow as possible. However, the phenomenon of leakage of voltage between adjoining signal electrodes, called crosstalk, appears more conspicuously as the gap is narrowed. Due to such a phenomenon, not only is color reproducibility deteriorated, but also stripes of different color appear at the portions above and below the window frame when a window is displayed on a monitor screen of a personal computer or the like. In the case of the plasma addressed electro-optical display panel, on account of its structure, it must be supplied with ten or more times as high a liquid crystal driving voltage as in a liquid crystal display panel of an active matrix type using thin-film transistors or the like. Hence, the amount of crosstalk becomes much greater than in the liquid crystal display panel of the active matrix type, and this causes deterioration in the quality of display and constitutes a problem that is to be solved.

A further description of crosstalk will be given with reference to FIG. 12. To make the description easier to understand, the parts of the plasma addressed electro-optical display panel shown in FIG. 12 are each denoted by reference numerals corresponding to those used for the plasma addressed electro-optical display panel shown in FIG. 8. The voltage applied to the signal electrode 105 is determined according to the picture data of each pixel on the basis of the applied voltage/transmittance characteristic of the liquid crystal layer 106. For example, in the case where the plasma addressed electro-optical display panel is driven in a normally-white mode, when a monochromatic green color is to be displayed all over the screen, a signal voltage of about 20V is applied to the signal electrodes to which Green is assigned by the color filter 150. To the adjoining signal electrodes to which Red and Blue are assigned, a signal voltage of about 80V is applied. Since the signal voltages are applied also at other timing than that when a discharge channel 130 is selected, leakages of the electric field in the horizontal direction as shown by the arrows are generated. As a result of the leakages of the electric field, the effective values of the signal voltages applied to the pixels affect the pixels such that their transmittance is lowered. Hence the transmittance of the green color to be displayed is lowered.

As another example, a case where a green-colored window is displayed with a white background on a screen 170 as shown in FIG. 13 will be mentioned. The same effects as described above are produced at the portions located above and below the window in the white background and the luminance at these portions is lowered. Especially in this case, while the electrodes to which Green is assigned receive effects from both sides, the signal electrodes to which Red and Blue are assigned are at the same voltage and, hence, they are affected only by the signal electrodes on one side thereof to which Green is assigned. Consequently, the portions located above and below the window that are to be displayed white come to have transmittance levels which are differently lowered by colors and, hence, lowered luminance with colors appears there.

SUMMARY OF THE INVENTION

In order to solve the above mentioned technical problem in the related art, the following means has been provided. Namely, the plasma addressed electro-optical display according to the present invention has a basic structure that is formed of a plasma cell, a liquid crystal cell, a dielectric sheet, a scanning circuit, and a signal circuit. The plasma cell has discharge channels arranged thereon in rows. The liquid crystal cell has signal electrodes arranged thereon in columns, which define pixels at the intersections with the discharge channels to thereby form an image. The dielectric sheet is interposed between both the cells which are joined to each other. The scanning circuit sequentially drives the discharge channels to discharge over the screen to thereby select pixels in each row through the dielectric sheet. The signal circuit drives the signal electrodes in synchronism with the driving for plasma discharge and in accordance with one image of picture data and writes signal voltages into the thus selected pixels. The apparatus includes a calculating circuit and a compensating circuit. The calculating circuit calculates effective potential differences occurring between adjoining signal electrodes in accordance with the picture data in each row and accumulates the results over one image. The compensating circuit, in accordance with the results of the accumulation, compensates for the signal voltages to be applied to the respective signal electrodes to thereby reduce the crosstalk caused by the potential differences between adjoining signal electrodes. Some embodiments will be described below. The calculating circuit includes a line memory for calculating the potential differences in each row and accumulating these values. A delay circuit for delaying transfer of picture data for one-image period may be provided so that the signal voltages for the following image are compensated for in accordance with the picture data of the preceding image. Otherwise, a frame memory for temporarily storing one image of picture data may be provided in order that signal voltages for one image may be compensated for in accordance with the picture data of the same image. The compensating circuit multiplies the result of accumulation by a coefficient to obtain a compensating value and adds the value to the picture data to generate a compensated signal voltage. The compensating circuit determines the coefficient by taking non-linearity of the transmittance of the liquid crystal cell with respect to the signal voltage into consideration. Otherwise, the compensating circuit may determine the coefficient by taking the human visual sensitivity into consideration. Also, a memory in which the compensating values associated with results of accumulation are previously written may be provided. The signal circuit, in anticipation of the range of the signal voltage to be varied by making compensation, may narrow in advance the range of the normally used signal voltage.

According to the present invention, the amount of crosstalk to occur is calculated in advance according to one image of picture data and it is compensated for by, for example, applying feedback control to the next image. Namely, the potential differences occurring between the signal electrodes in accordance with the picture data (frame information) of one image are calculated and integrated for each signal electrode and the effective value thereof is calculated. The effective value is multiplied by a suitable coefficient to obtain a compensating value and this value is added to the picture data of the next image and, thereby, the signal voltage is compensated for. The plasma addressed electro-optical display according to the present invention is provided with a frame memory for storing the picture data forming one image, i.e., one frame. By the use of the picture data, the signal voltage to be applied to each signal electrode is determined. At this time, the effective value of the potential differences occurring between each signal electrode and adjoining signal electrodes is calculated over one frame period. Thereby, the effects from the adjoining signal electrodes specific to each signal electrode can be found. In accordance with the result, the picture data to be assigned to each pixel is compensated for with the effects from the adjoining signal electrodes taken into consideration and, thus, the signal voltage to be actually applied to the signal electrode is determined.

DESCRIPTION OF THE PREFERRED EMBODIMENTS

Figure 1:
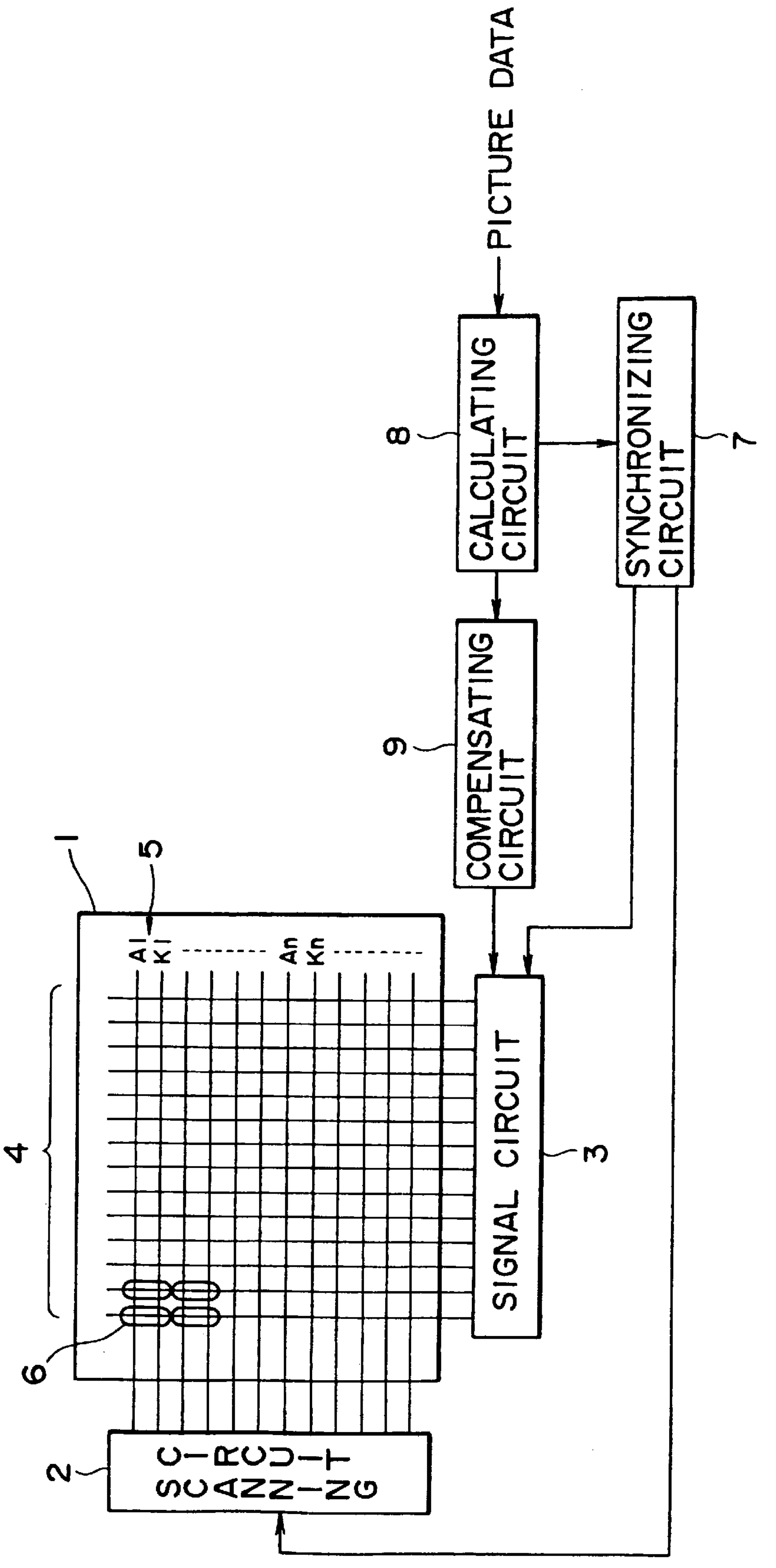
FIG. 1 is a block diagram showing a basic configuration of a plasma addressed electro-optical display according to the invention.
Figure 8:
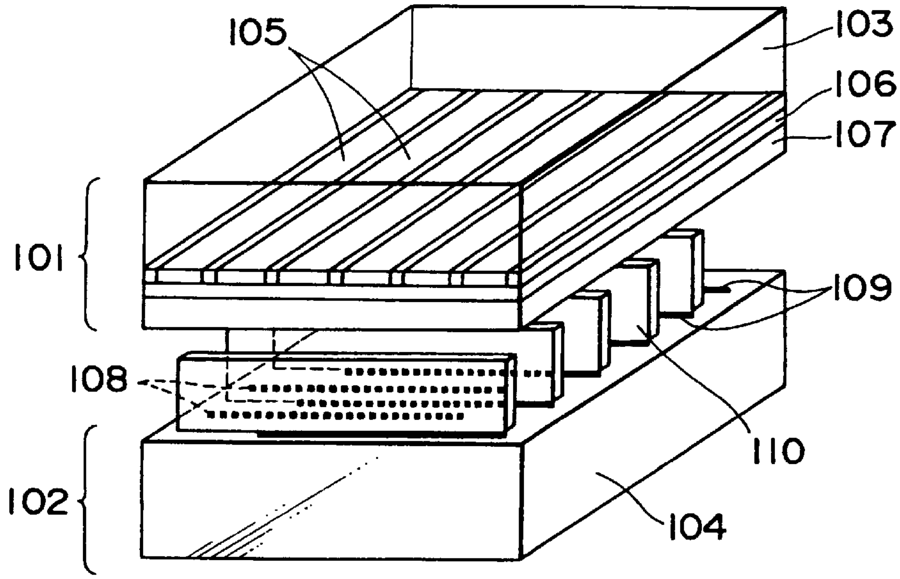
FIG. 8 is a perspective view showing a general configuration of a related art plasma addressed electro-optical display.
Figure 9:
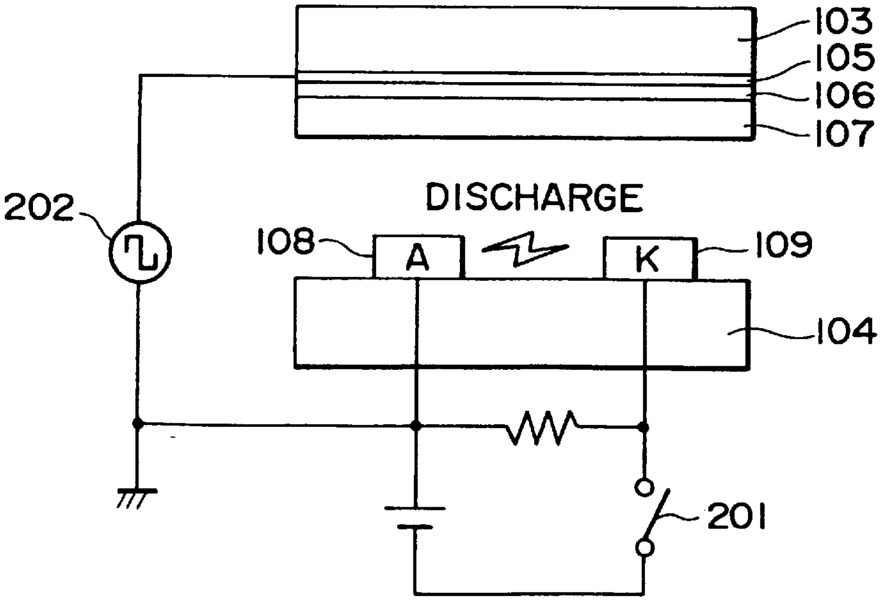
FIG. 9 is a block diagram showing similarly a circuit configuration of a related art plasma addressed electro-optical display.
Figure 10:
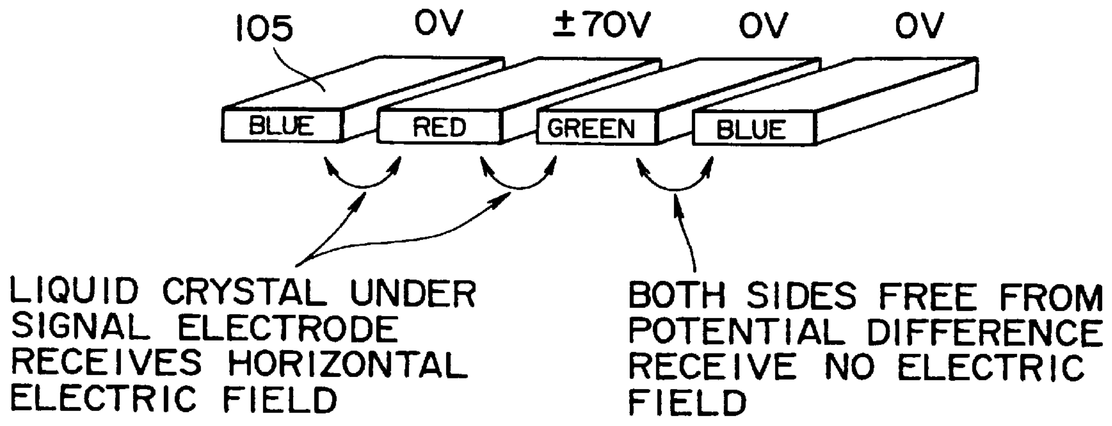
FIG. 10 is a schematic diagram explaining the a problem with a related art plasma addressed electro-optical display.
Figure 11:
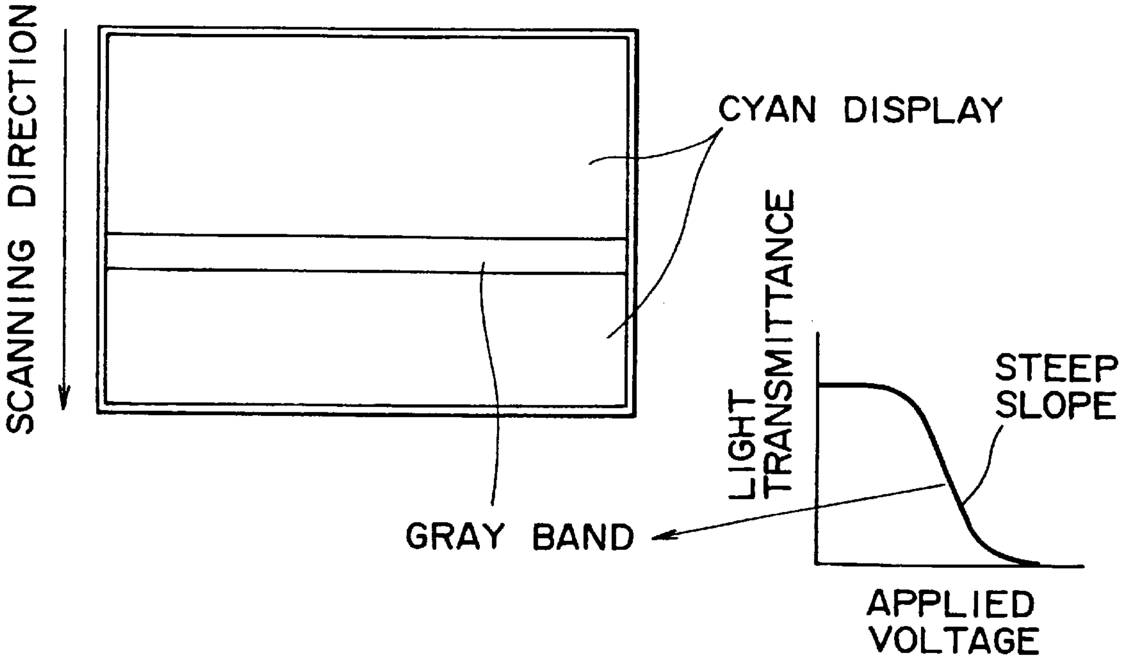
FIG. 11 shows a schematic diagram which similarly explains the problem.
Figure 12:
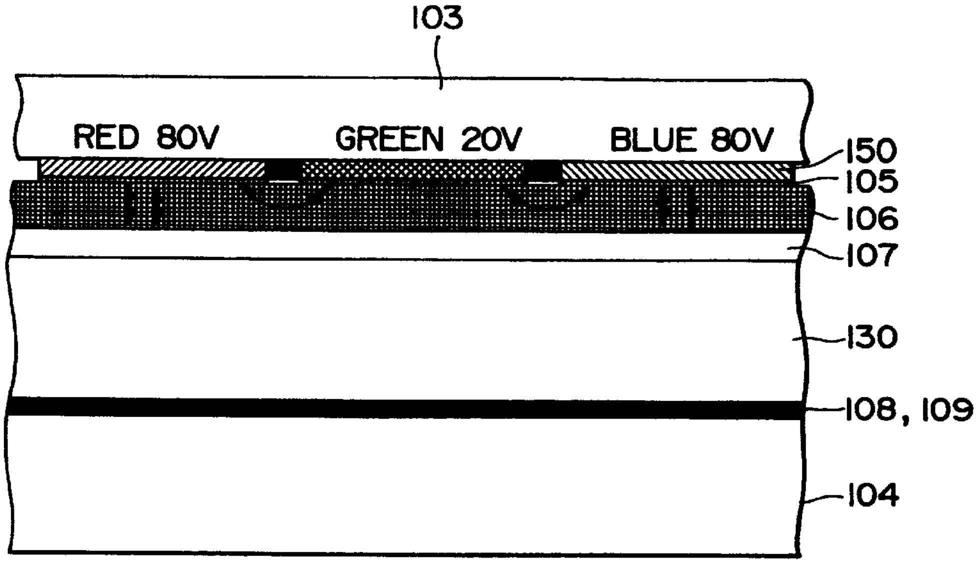
FIG. 12 shows a schematic diagram which similarly explains the problem.
Figure 13:
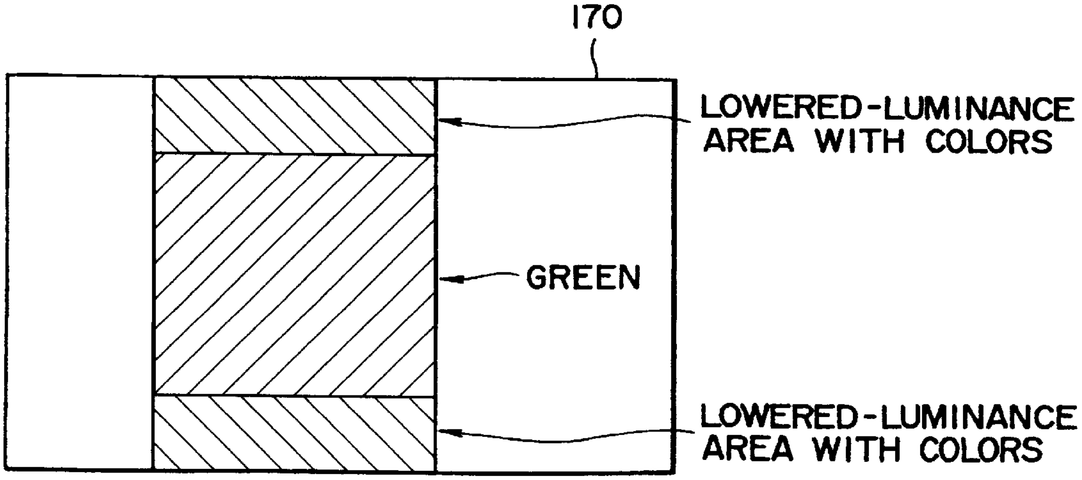
FIG. 13 shows a schematic diagram which similarly explains the problem.

With reference to the accompanying drawings, a preferred embodiment of the invention will be described. FIG. 1 is a block diagram showing a basic configuration of a plasma addressed electro-optical display according to the invention. The present plasma addressed electro-optical display in its basic configuration has a panel 1, a scanning circuit 2, and a signal circuit 3. The panel 1 has a laminated structure with a liquid crystal cell and a plasma cell affixed together, basically as shown in FIG. 8. Namely, the liquid crystal cell and the plasma cell have a dielectric sheet, formed of a thin glass plate or the like, interposed in between. While the liquid crystal cell has signal electrodes 4 arranged in columns, the plasma cell has display channels 5 arranged in rows. The display channels 5 are formed of pairs of an anode A and a cathode K. At the intersections of the signal electrodes 4 and the display channel 5, there are defined pixels 6. The pixels 6 are disposed in a matrix array and form an image. The scanning circuit 2 sequentially drives the display channels 5 to generate a discharge across the screen and, thereby, selects the pixels 6 in one row after another through the dielectric sheet. The signal circuit 3, in synchronism with the driving of the discharge and in accordance with one image of picture data, drives the signal electrodes 4 to thereby write signal voltages into the selected pixels. A circuit 7, which generates a synchronizing signal necessary for synchronizing both the circuits, is connected to the scanning circuit 2 and the signal circuit 3.

As a point characteristic of the invention, a calculating circuit 8 and a compensating circuit 9 are connected to the signal circuit 3. The calculating circuit 8, in accordance with the picture data, calculates effective potential differences occurring between adjoining signal electrodes 4 in each row and accumulates the results over one image. The compensating circuit 9, on the basis of the results of the accumulation, compensates for the signal voltages applied to the respective signal electrodes 4 to thereby reduce crosstalk caused by the potential differences between adjoining signal electrodes 4. The calculating circuit 8 includes a line memory for calculating the potential differences in each row and accumulating the results. In an example, a delay circuit for delaying transfer of picture data for one image period may be provided in order that the signal voltage for the following image is compensated for in accordance with the picture data of the preceding image. Otherwise, a frame memory for temporarily storing one image of picture data may be provided in order that signal voltages for one image may be compensated for in accordance with the picture data of the same image. The compensating circuit 9 multiplies the result of accumulation by a coefficient to obtain a compensating value and adds the value to the picture data to generate a compensated signal voltage. The compensating circuit 9 determines the coefficient by taking non-linearity of the transmittance of the liquid crystal cell with respect to the signal voltage into consideration. Otherwise, the compensating circuit 9 may be adapted to determine the coefficient by taking the human visual sensitivity into consideration. Also, a memory in which compensating values associated with results of accumulation are previously written may be provided. The signal circuit 3, in anticipation of the range of the signal voltage to be varied by making compensation, narrows the range of the normally used signal voltage in advance.

Figure 2:
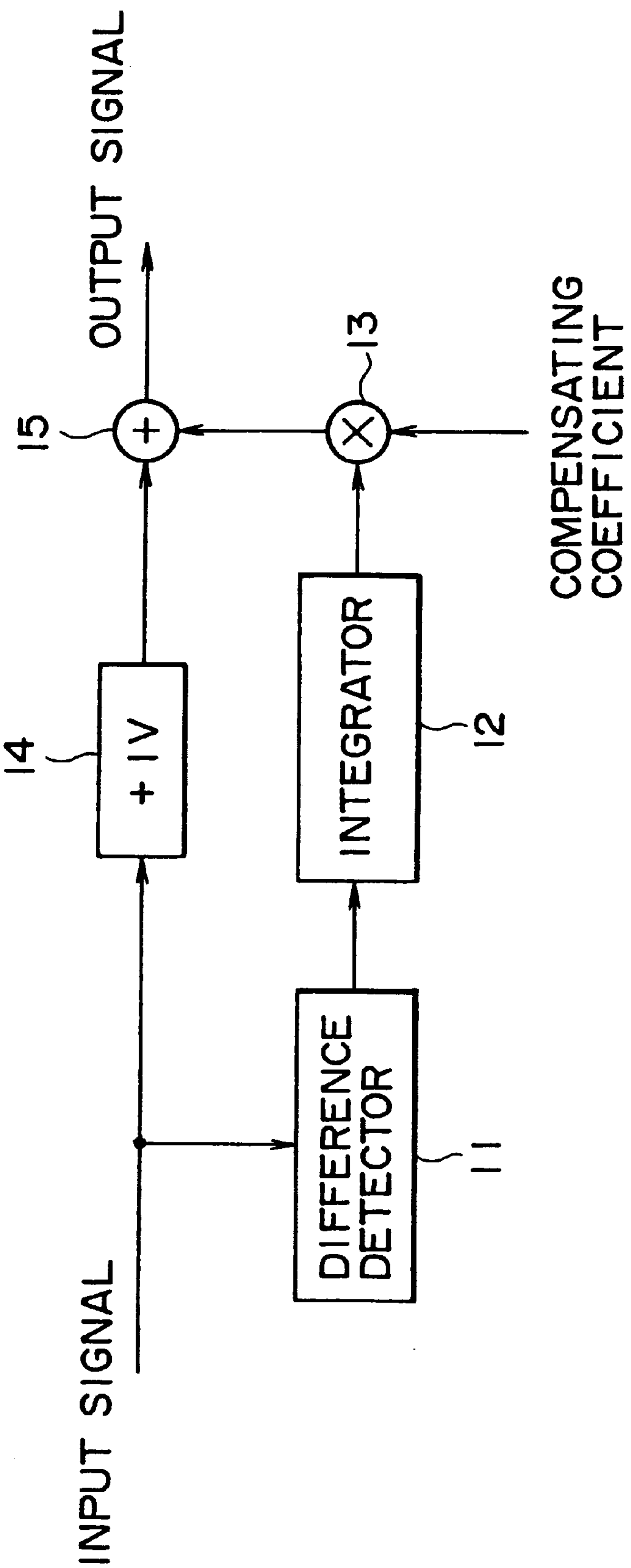
FIG. 2 is a block diagram showing a first embodiment of a plasma addressed electro-optical display according to the invention.

FIG. 2 is a block diagram showing a concrete example of the configuration of the calculating circuit 8 and the compensating circuit 9 shown in FIG. 1. The example of configuration comprises a difference detector 11, an integrator 12, a multiplier 13, a delay circuit (+1V) 14, and an adder 15. Of these components, the difference detector 11 and the integrator 12 constitute the calculating circuit 8 in FIG. 1 and the multiplier 13 and the adder 15 constitute the compensating circuit 9 in FIG. 1. First, the difference detector 11, in accordance with the input signal (picture data), detects by calculation the intensity of the electric field which each signal electrode receives from both the adjoining signal electrodes. Then, the integrator 12 accumulates the data pertinent to each signal electrode. The multiplier 13 multiplies the accumulated difference data by a specific coefficient to obtain a compensating value. Lastly, the compensating value is added in the adder 15 to the picture data of the image delayed by one frame period (1 V) (i.e., the following image) by the delay circuit 14. The integrator 12 can be formed of one line memory and one controller for write/read control. Also, it is possible, in principle, to make fine compensation by the use of a frame memory recording the whole of one image. However, by using the line memory in the present embodiment, the calculating circuit becomes simple in structure and manufacturable at low cost. As a result of simulating calculation on a computer, it was confirmed that the crosstalk could be compensated for fairly effectively even if the coefficient was set to a fixed value.

Figure 3:
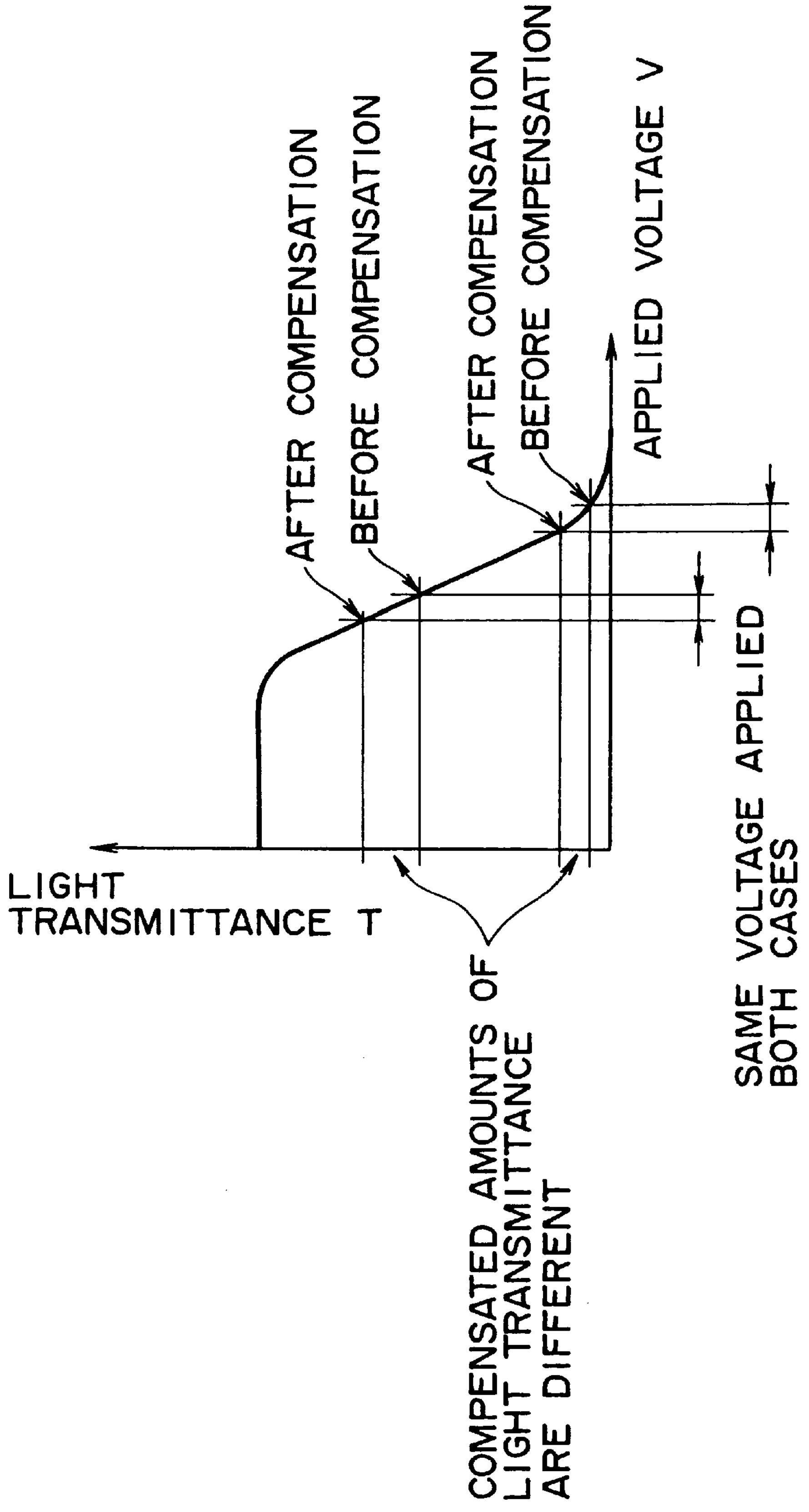
FIG. 3 shows a transmission/applied voltage characteristic graph explaining the operation of the first embodiment shown in FIG. 2.

It is possible, as describe above, to compensate for crosstalk to a certain level with the use of a fixed value as the compensating coefficient. However, an actual liquid crystal has a nonlinear applied voltage V/light transmittance T characteristic as shown in FIG. 3. Hence, if voltage compensation with such a fixed value is made, there will be produced some portions where the compensation is effectively made and other portions where the compensation is made less effectively. More specifically, around the half tone level where the curve is steeper and the sensitivity to the applied voltage is higher, the transmittance is varied more greatly by the compensated voltage. However, at saturated levels, where the curve is gentler and the sensitivity is lower, the degree of the variation is lower. Since the amount of crosstalk itself is also varied by the applied voltage V/light transmittance T characteristic, it is considered that a complex voltage is applied in the real display. Therefore, in some cases, a smooth compensation becomes unattainable by calculation through the use of a simple, fixed compensating coefficient. Hence, more effective compensation for crosstalk can be attained by using a compensating coefficient in accordance with information to be compensated for, i.e., "the position in the V/T characteristic of the signal electrode in the next frame."

Since the human visual sensitivity is more sensitive to brightness, changes in a green color, which contributes to luminance, are liable to become conspicuous to the eye. Therefore, it is desired that the compensating coefficient be precisely calculated for the green color by such means as emphasizing. It is not preferable that color tone be varied by the compensation. Hence, by calculating the compensating coefficient in accordance with the visual sensitivity characteristic of the information to be compensated for, more faithful color reproduction becomes possible.

Although the above described compensating coefficient is variable, it is a value that can be calculated if the potential differences between a signal electrode and both the adjoining signal electrodes are known. Therefore, even when the compensating coefficient is variable, not to mention the case of it being fixed, the compensating coefficients may be stored in a memory device such as a RAM or a ROM to thereby prepare a table. Then, high speed signal processing may be made by using a method to refer to the table at the time of displaying.

Figure 4A:
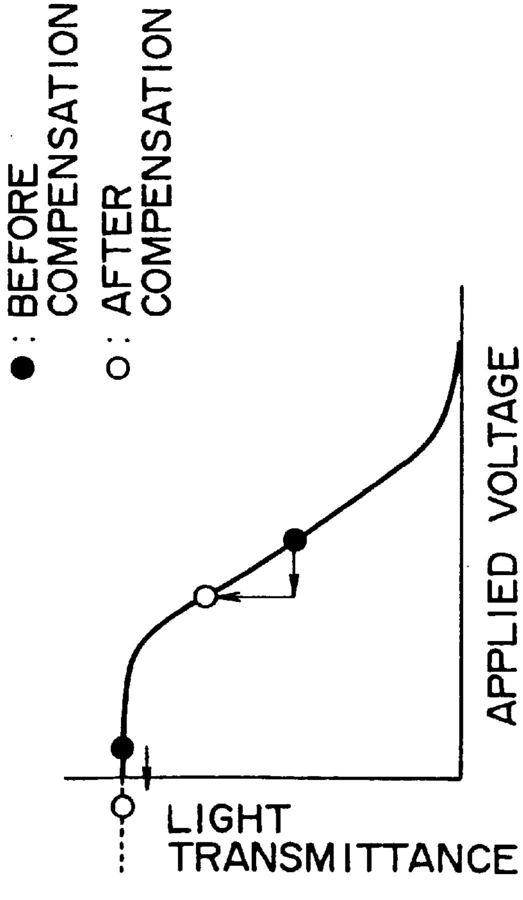
FIGS. 4A and 4B show transmission/applied voltage characteristic graphs similarly explaining the operation of the embodiment shown in FIG. 2.
Figure 4B:
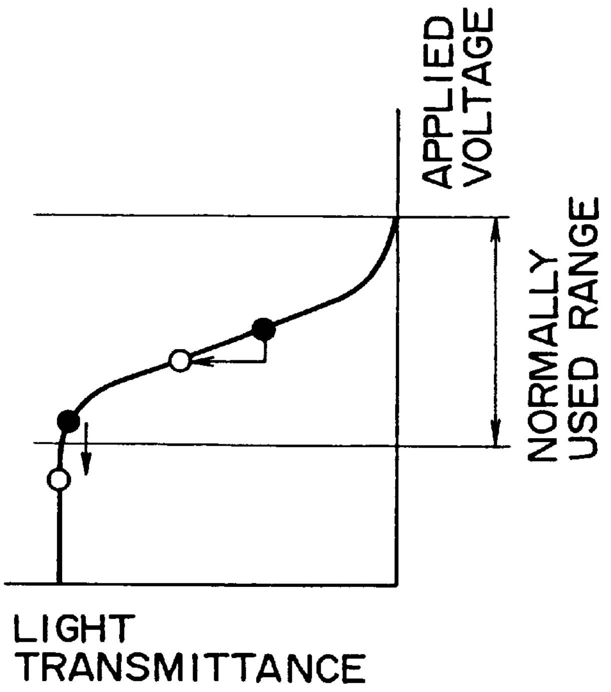

Depending on picture data, there may arise a case where the result of the compensating calculation gives "a nonexistent negative value in the V/T characteristic" as shown in FIG. 4A. Then, the range of the signal voltages to be used when no compensation is made is narrowed in advance as shown in FIG. 4B. Of course, it is assumed here that a picture image can be sufficiently displayed by using the applied voltages within this range. By so doing, even if the compensating value is a negative value, the value after the addition can be calculated as a positive value on the V/T characteristic curve. Of course, the amount of the compensating value at this time will be set within the range to make the value after the addition positive.

Figure 5:
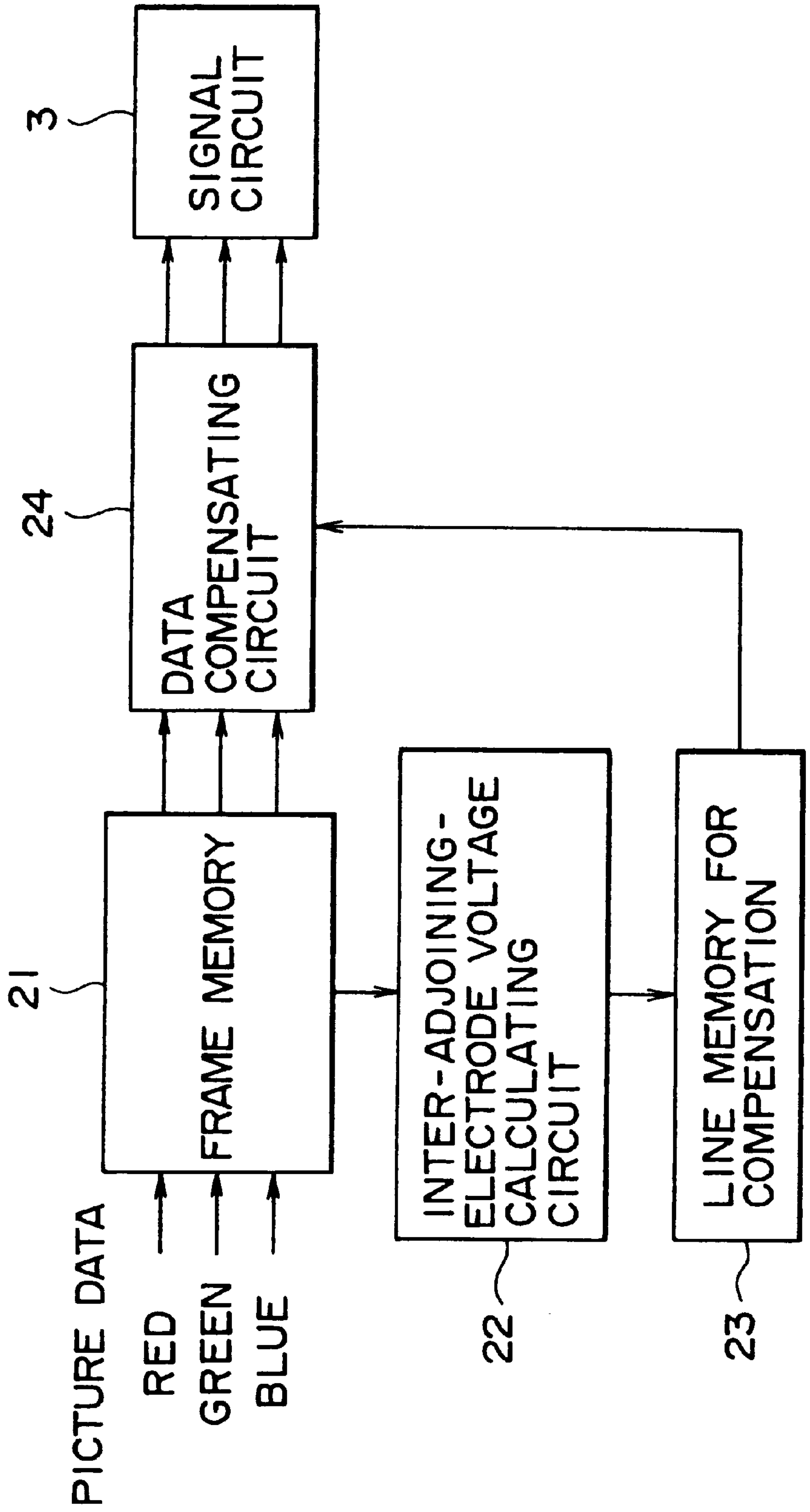
FIG. 5 is a block diagram showing a second embodiment of a plasma addressed electro-optical display according to the invention.

FIG. 5 is a block diagram showing another embodiment of a plasma addressed electro-optical display. This embodiment includes a frame memory 21, an inter-adjoining-electrode voltage calculating circuit 22, a line memory for compensation 23, and a data compensating circuit 24. The frame memory 21 receives picture data separated into Red, Green and Blue. The data compensating circuit 24 is connected to the signal circuit 3. The inter-adjoining-electrode voltage calculating circuit 22 includes another line memory and it corresponds to the calculating circuit 8 shown in FIG. 1. Further, the data compensating circuit 24 corresponds to the compensating circuit 9 shown in FIG. 1. First, the picture data is sequentially written into the frame memory 21. In this case, every time data of one row (one line) are taken in, the differences of the picture data between the adjoining signal electrodes are calculated for each signal electrode and the results are written into the line memory incorporated in the inter-adjoining-electrode voltage calculating circuit 22. At this time, after the differences pertinent to each individual picture data have been calculated, the same are added together and the square of the sum is calculated. Further, the content written in the line memory one line period before is added to the square and the sum is written into the line memory again. Such operations are repeated in turn and, when the picture data for one frame have been written in the frame memory 21, the contents in the line memory incorporated in the inter-adjoining-electrode voltage calculating circuit 22 are transferred to the line memory for compensation 23. During the time that the picture data of the next frame are written in, the contents of the picture data already written therein are sequentially read out into the data compensating circuit 24 and, therein, compensation is made in accordance with the effective potential difference, calculated for each signal electrode, between each signal electrode and the adjoining signal electrodes, and thus the value of the signal voltage to be actually output to the signal electrode is determined.

Figure 6:
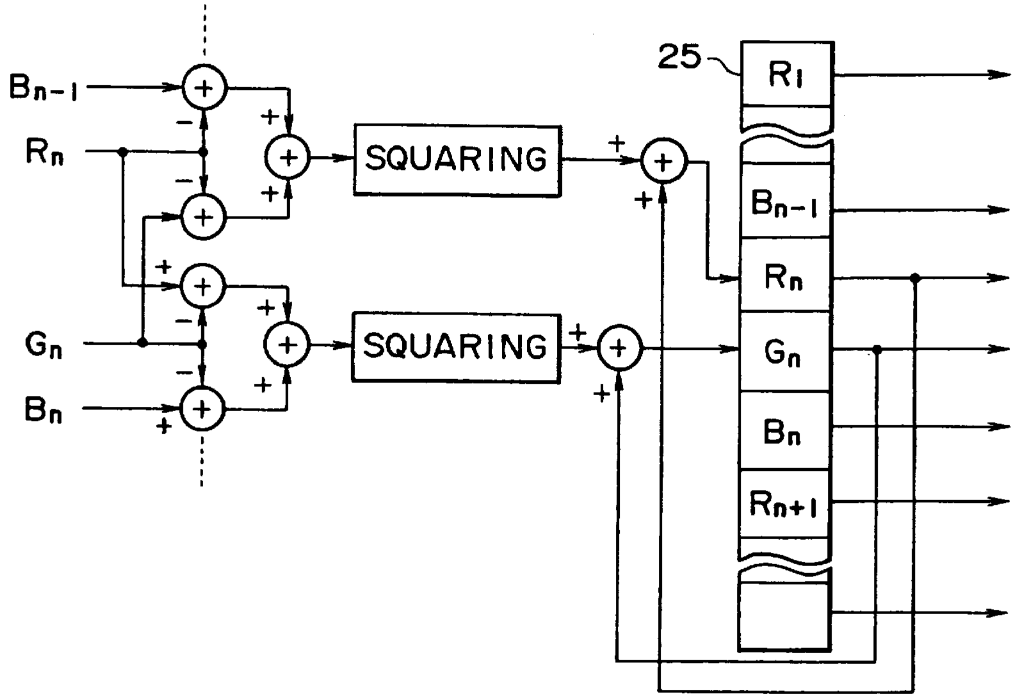
FIG. 6 is a block diagram showing a specific configuration of an inter-adjoining-electrode voltage calculating circuit included in the embodiment shown in FIG. 5.

FIG. 6 shows a specific configuration of the inter-adjoining-electrode voltage calculating circuit 22 shown in FIG. 5. The calculating circuit has one line memory 25, four adders, and one squaring circuit for each color. If attention is paid for example to the picture data Rn assigned to the n-th red pixel, the differences between the same and Bn−1 and Gn are each calculated. After (Rn−Bn−1) and (Gn−Rn) are added together, the square of the sum is calculated. Further, the content Rn recorded in the line memory 25 one line period before is added to the result of the squaring calculation and the result is again written into the line memory 25 at the same address. Thus, in accordance with the picture data, the effective potential differences occurring between adjoining signal electrodes are calculated in each row and the results are accumulated over one image. Also, (Gn−Rn) and (Bn−Gn) are calculated similarly for the picture data Gn, these are added together, and the square value of the result is calculated. The result of the squaring calculation is added to the picture data Gn recorded one line before and the sum is stored into the line memory 25 at the same address.

Figure 7:
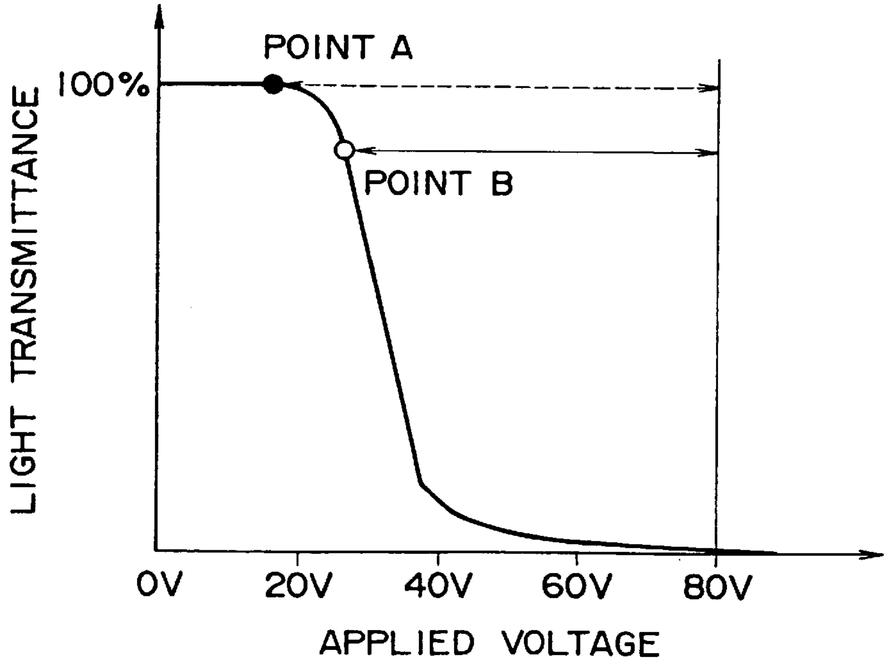
FIG. 7 is a graph showing an applied voltage/transmission characteristic explaining the operation of the embodiment shown in FIG. 5.

Finally, referring to FIG. 7, the actual compensating method performed in the data compensating circuit 24 shown in FIG. 5 will be described. FIG. 7 is a graph showing an applied voltage/transmittance characteristic of a liquid crystal cell. Driving points in the normal case are within the range indicated by the broken line taking the black dot in the graph as the reference. However, a transmission factor of 100% cannot be obtained with the content of a display in which crosstalk occurs. The transmittance brought down to the lowest by crosstalk is set as a new highest white level. In the case of the picture data producing no crosstalk, virtually zeros are written in the line memory for compensating value 23 (refer to FIG. 5). Although the portion of the signal electrode displaying the white color in such case has the transmittance at the point A, compensated data providing the transmittance at the point B is sent to the signal circuit 3 (refer to FIG. 5). Further, in such a case where the value in the line memory for compensating value 23 is at its maximum, since the portion of the signal electrode displaying the white color has already obtained the transmittance around the point B due to crosstalk, no compensation is made. Although, in practice, not only the portion making a white display but also the portions making a color or half tone display suffer changes in the transmittance by the amount of crosstalk, it is possible to compensate for the data so that the transmittance becomes constant by using a similar method and send the compensated data to the signal circuit 3. The data to be transmitted to the signal circuit 3 is determined by the content of the line memory for compensating value 23 and the content read out from the frame memory 21. This is because the manner in which the crosstalk is seen depends on the display luminance. In practice, however, depending on the amount of crosstalk, a constant amount of compensation may simply be made according to the content of the line memory for compensating value 23, regardless of the content read out from the frame memory 21.

According to the invention, as described above, when attention is paid to one signal electrode, by providing compensation thereto through reverse calculation of the effects from the signal electrodes adjoining thereto, deterioration in color reproducibility called the crosstalk can be reduced. Further, an effective approach to the problem can be made in view of cost and processing speed by using an economical device such as a line memory. Further, by having compensating coefficients stored in memory in advance, high speed processing becomes possible. By the use of the described configuration, when, for example, a colored window is displayed, the crosstalk appearing above and below the window can be reduced and the quality of the picture can be improved.

What is claimed is:

1. A plasma addressed electro-optical display comprising:

a plasma cell including discharge channels arranged thereon in rows;

a liquid crystal cell including signal electrodes arranged thereon in columns for defining pixels at the intersections with said discharge channels;

a dielectric sheet interposed between said plasma cell and said liquid crystal cell;

a scanning circuit for sequentially driving said discharge channels thereby selecting pixels in each row through said dielectric sheet;

a signal circuit for driving said signal electrodes in synchronism with the driving of said discharge channels and in accordance with one image of picture data thereby writing signal voltages into said selected pixels;

a calculating circuit for calculating, in accordance with picture data, effective potential differences between adjoining signal electrodes in each row and accumulating the results over one image;

a compensating circuit for compensating for the signal voltages to be applied to the respective signal electrodes in accordance with the obtained results of calculation in said calculating circuit, said compensating circuit adding a compensating value, which is obtained by multiplying the result of accumulation by a coefficient, to picture data to thereby generate a compensated signal voltage, said coefficient used in said compensating circuit being determined by taking nonlinearity of the transmission of said liquid crystal cell with respect to the signal voltage into consideration.

2. A plasma addressed electro-optical display according to claim 1, rein said calculating circuit includes a line memory for accumulating the potential differences calculated in each row.

3. A plasma addressed electro-optical display according to claim 1, further comprising:

a delay circuit for delaying transfer of picture data for one image-period in order that signal voltages for the following image are compensated for in accordance with the picture data of the preceding image.

4. A plasma addressed electro-optical display according to claim 1, further comprising:

a frame memory for temporarily storing picture data.

5. A plasma addressed electro-optical display according to claim 1, further comprising:

a memory device in which compensating values associated with results of calculation as table data are written in advance.

6. A plasma addressed electro-optical display according to claim 1, wherein said signal circuit, in anticipation of a range of signal voltage to be varied by making compensation, narrows the range of the signal voltage in advance.

7. A plasma addressed electro-optical display according to claim 1, wherein said calculating circuit has a difference detector and an integrator.

8. A plasma addressed electro-optical display according to claim 1, wherein said compensating circuit has a multiplier and an adder.

9. A plasma addressed electro-optical display comprising:

a plasma cell including discharge channels arranged thereon in rows;

a liquid crystal cell including signal electrodes arranged thereon in columns for defining pixels at the intersections with said discharge channels;

a dielectric sheet interposed between said plasma cell and said liquid crystal cell;

a scanning circuit for sequentially driving said discharge channels thereby selecting pixels in each row through said dielectric sheet;

a signal circuit for driving said signal electrodes in synchronism with the driving of said discharge channels and in accordance with one image of picture data thereby writing signal voltages into said selected pixels;

a calculating circuit for calculating, in accordance with picture data, effective potential differences between adjoining signal electrodes in each row and accumulating the results over one image;

a compensating circuit for compensating for the signal voltages to be applied to the respective signal electrodes in accordance with the obtained results of calculation in said calculating circuit, said compensating circuit adding a compensating value, which is obtained by multiplying the result of accumulation by a coefficient, to picture data to thereby generate a compensated signal voltage, said coefficient used in said compensating circuit being determined by taking human visual sensitivity into consideration.

10. A method of driving a plasma addressed electro-optical display, which has:

a plasma cell including discharge channels arranged thereon in rows;

a liquid crystal cell including signal electrodes arranged thereon in columns for defining pixels at the intersections with said discharge channels; and a dielectric sheet interposed between said plasma cell and said liquid crystal cell;

comprising the steps of:

sequentially driving said discharge channels thereby selecting pixels in each row through said dielectric sheet;

driving said signal electrodes in synchronism with said driving of said discharge channels and in accordance with picture data on one screen thereby writing signal voltages into said selected pixels;

calculating effective potential differences between adjoining signal electrodes in accordance with picture data and accumulating the results over one image; and compensating the signal voltages to be applied to the respective signal electrodes in accordance with the obtained results of calculation in said calculating circuit, performed in a compensating circuit, of adding a compensating value, which is obtained by multiplying the result of accumulation by a coefficient, to picture data to thereby generate a compensated signal voltage, wherein a coefficient determined by taking non-linearity of the transmittance of the liquid crystal cell with respect to the signal voltage into consideration is used for the compensating.

11. A method of driving a plasma addressed electro-optical display according to claim 10, further comprising the step of:

accumulating, by the use of a line memory, the potential differences calculated in each row.

12. A method of driving a plasma addressed electro-optical display according to claim 10, further comprising the step of:

delaying transfer of picture data for one image-period, by the use of a delay circuit, in order that signal voltages for the following image are compensated for in accordance with the picture data of the preceding image.

13. A method of driving a plasma addressed electro-optical display according to claim 10, further comprising the step of:

temporarily storing picture data in a frame memory.

14. A method of driving a plasma addressed electro-optical display according to claim 10, wherein compensating values associated with results of calculation are written in a memory device as table data in advance.

15. A method of driving a plasma addressed electro-optical display according to claim 10, further comprising the step, in anticipation of the range of signal voltage to be varied by making compensation, of narrowing the range of the signal voltage in advance.

16. A method of driving a plasma addressed electro-optical display, which has:

a plasma cell including discharge channels arranged thereon in rows;

a liquid crystal cell including signal electrodes arranged thereon in columns for defining pixels at the intersections with said discharge channels; and a dielectric sheet interposed between said plasma cell and said liquid crystal cell;

comprising the steps of:

sequentially driving said discharge channels thereby selecting pixels in each row through said dielectric sheet;

driving said signal electrodes in synchronism with said driving of said discharge channels and in accordance with picture data on one screen thereby writing signal voltages into said selected pixels;

calculating effective potential differences between adjoining signal electrodes in accordance with picture data and accumulating the results over one image; and compensating the signal voltages to be applied to the respective signal electrodes in accordance with the obtained results of calculation in said calculating circuit, performed in a compensating circuit, of adding a compensating value, which is obtained by multiplying the result of accumulation by a coefficient, to picture data to thereby generate a compensated signal voltage, wherein a coefficient determined by taking human visual sensitivity into consideration is used for the compensating.

* * * * *